June 7, 1932.  C. SIFTON  1,861,482

TRANSMISSION MECHANISM

Filed June 23, 1930

Inventor
C. Sifton
by J. Edw. Maybee
ATTY.

Patented June 7, 1932

1,861,482

UNITED STATES PATENT OFFICE

CLIFFORD SIFTON, OF TORONTO, ONTARIO, CANADA

TRANSMISSION MECHANISM

Application filed June 23, 1930. Serial No. 463,083.

It has been proposed to obtain a gradual engagement for direct drive between two alined shafts by the use of epicyclic gearing provided with means for producing a braking effect between parts of the mechanism having relative rotation as in my co-pending application 414,089, filed December 14, 1929. Such mechanisms give a variable speed of the driven shaft from zero up to the speed of the driving shaft but without increased torque at the lower speeds, and my object is to devise mechanism of this type which will give the same smooth engagement and range of speed of the driven shaft with the necessary greater torque at low speeds.

I attain my object by providing, in addition to the braking means between parts of the gearing, means for producing a braking effect between a part of the gearing tending to rotate in the opposite direction to the shafts and a stationary part (housing), the arrangement being such that the said part is free to rotate relative to the stationary part (housing) in the same direction as the shafts. Specifically a sun pinion loose on one shaft is connected by a planetary system with a gear fast on the other shaft. A brake disk non-rotatably mounted on the hub of the sun pinion is engageable by a brake disk non-rotatably mounted on one of the shafts. The brake disk of the sun pinion is also engageable with a brake disk mounted on a stationary part (housing) so as to rotate freely thereon in the direction of rotation of the shafts, but not in a reverse direction. Means are provided to effect a, preferably, simultaneous engagement of the braking surfaces.

Figure 1:
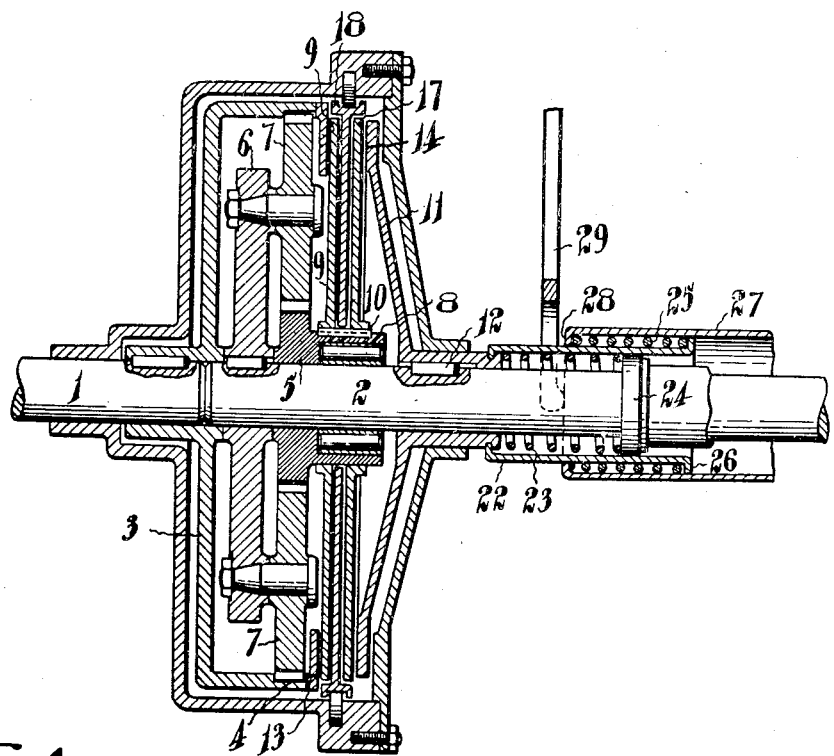
Figure 2:
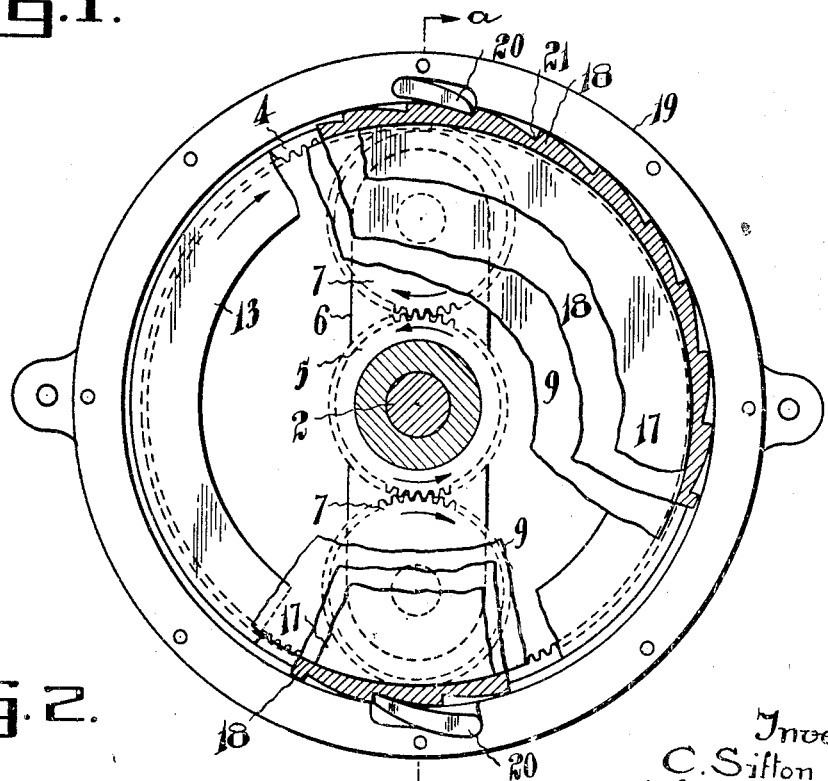

A satisfactory embodiment of my invention is hereinafter fully described and is illustrated in the accompanying drawing in which Fig. 1 is a longitudinal section of gearing constructed in accordance with my invention; and Fig. 2 an elevation partly in section and partly broken away, of the gearing.

In the drawing like numerals of reference indicate corresponding parts in the different figures.

1 and 2 are shafts, and on the shaft 1 is secured a drum 3 carrying an internal gear wheel 4. On the shaft 2 is revolvably mounted a sun pinion 5. On the shaft 2 is also secured a frame 6 carrying one or more planetary gears 7 meshing with both the sun pinion and the internal gear 4. On the hub 8 of the sun pinion is mounted a brake disk 9 by means of a feather key 10, the connection being such that, while the disk is revolvable with the sun pinion, it is also axially movable relative thereto. Similarly mounted on the hub 8 is a second brake disk 17. On the shaft 2 is mounted a brake disk 11 by means of a feather key 12, the connection being such that, while the disk is revolvable with the shaft, it is also slidable axially thereof.

The drum 3 and the disk 11 are respectively provided with the brake surfaces 13, 14 engaging the outer sides of the disks 9 and 17. Between the disks 9 and 17 is positioned a brake disk 18, preferably of annular form, and mounted on a stationary part such as a casing 19 enclosing the mechanism. This brake disk is mounted on the casing so as to slide axially thereof, and also to rotate freely in the same direction as the direction of rotation of the shafts, but is held from movement in the opposite direction by means of one or more dogs 20 mounted in the casing and engaging ratchet teeth 21 formed on the periphery of the disk 18.

Any known shifting means may be provided for axially moving the brake disk 11 to engage the braking surfaces of the various disks. Preferably I provide means for applying resilient pressure to produce the desired movement. In the drawing I show a cylindrical housing 22 connected with the hub of the brake disk 11. In this housing is positioned a coil spring 23 engaging the hub of the disk 11 and a collar 24 secured to the shaft 2. This spring is sufficiently strong to press the braking surfaces so tightly together that they lock and rotate as a unit, this movement being possible by the dog and ratchet engagement between the disk 18 and the casing 19. Positioned on the housing 22 is a coil spring 25 bearing against a collar 26 formed at the outer end of the housing 22.

A second spring housing 27 is fitted over the housing 22 and encloses the spring 25. The inner end of this housing is formed with a collar 28 against which the inner end of the spring 25 abuts. A shifter device 29 of any ordinary type is provided whereby the housing 27 may be shifted as desired to relieve the tension of the spring 23 and thus reduce the frictional engagement between the surfaces of the brake members.

From the construction described it follows that, if sufficient pressure be exerted on the disk 11 by the spring 23 various braking surfaces will be clamped together to hold the sun pinion from rotation, the two shafts are thus caused to revolve together if one of them be driven. If, however, the pressure on the brake disk 11 is somewhat relieved, slippage occurs between the braking surfaces carried by the shaft and the braking surfaces carried by the sun pinion so that the planetary gears may revolve about the sun pinion, thus giving a movement of one shaft relative to the other in the same direction but at a different speed, the speed being variable in proportion to the relative movement of the sun pinion and the shaft on which it is mounted, which relative movement depends on the extent of the frictional retardation of the brake disks 9 and 17. As the brake disks 9 and 17 are also retarded by their frictional engagement with the brake disk 18 which is held from revolving, a fulcrum is provided so that the reduced speed of the driven shaft 2 is accompanied by increased torque.

As the fundamental feature of the invention lies in the combination of the braking system between parts of the gear and the braking system between a part of the gear and a stationary part, it is evident that the exact construction of the epicyclic gear train may be widely varied without departing from the spirit of my invention.

What I claim as my invention is:

1. In transmission mechanism, the combination of a driving and a driven shaft; an epicyclic gear train interposed between the shafts including a loose sun pinion; means for applying a variable frictional resistance to the rotation of the sun pinion relative to the shafts; a stationary part; means engaging said part for applying resistance to the rotation of the sun pinion relative to said part; and means for simultaneously varying both resistances.

2. In transmission mechanism, the combination of a driving and a driven shaft; an epicyclic gear train interposed between the shafts including a loose sun pinion; a braking surface carried by and rotatable with the sun pinion; a braking surface carried by and rotatable with one of the shafts and engageable with the braking surface of the sun pinion; a stationary part; a braking surface carried by said part concentric with the shaft; and means for pressing the frictional surfaces into engagement to apply a frictional resistance to the rotation of the sun pinion relative to the shafts and to the rotation of the sun pinion relative to the stationary part.

3. In transmission mechanism, the combination of a driving and a driven shaft; an epicyclic gear train interposed between the shafts including a loose sun pinion; means for applying a variable frictional resistance to the rotation of the sun pinion relative to the shafts; a stationary part; means engaging said part for applying resistance to the rotation of the sun pinion relative to said part; means for simultaneously varying both resistances; and means for permitting the braking surface of the stationary part to rotate relative thereto in the direction of rotation of the shafts when the friction surfaces are locked together by the application of sufficient pressure.

4. In transmission mechanism, the combination of a driving and a driven shaft; an epicyclic gear train interposed between the shafts including a loose sun pinion; braking surfaces carried by and rotatable with the sun pinion and each shaft respectively; a stationary part; a braking surface concentric with the shafts; means for holding said braking surface from rotation relative to the stationary part in a direction reverse to that of the normal rotation of the shafts; and means for engaging said surfaces to apply more or less frictional resistance to the rotation of the sun pinion relative to the shafts and relative to the stationary part.

5. In transmission mechanism, the combination of a driving and a driven shaft; an internal gear connected to one shaft; a sun pinion loose on the other; a planetary gear system interposed between the internal gear and the sun pinion; a brake disk rotatable with but axially slidable relative to the sun pinion; brake disks rotatable with the shafts, one at least being axially displaceable to effect braking contact between the three disks; a stationary part; a braking surface concentric with the shafts; means for holding said braking surface from rotation relative to the stationary part in a direction reverse to that of the normal rotation of the shafts; and means for engaging said surfaces to apply more or less frictional resistance to the rotation of the sun pinion relative to the shafts and relative to the stationary part.

6. In transmission mechanism, the combination of a driving and a driven shaft; an internal gear connected to one shaft; a sun pinion loose on the other; a planetary gear system interposed between the internal gear and the sun pinion; two brake disks rotatable with but axially slidable relative to the sun pinion; brake disks rotatable with the shafts, one at least being axially displaceable to effect braking contact between the disks; a stationary part; a braking disk concentric with the shafts and axially displaceable relative thereto, said disk being positioned between the sun pinion brake disks; means for holding said disk from rotation in a direction reverse to that of the normal rotation of the shafts; and means for actuating the axially displaceable brake disk of one of the shafts to effect braking contact between the disks.

7. In transmission mechanism, the combination of a drive shaft; a driven shaft; a braking member connected to the drive shaft; a braking member carried by the driven shaft; normally free gearing interposed between the shafts; a third braking member interposed between the aforesaid braking members; a stationary part; means for connecting said third braking member to the said part to permit its rotation relative thereto in one direction only; and means whereby the braking members may be engaged.

8. In a transmission mechanism, the combination of a drive shaft; a driven shaft; a braking member connected to the drive shaft; a braking member carried by the driven shaft; normally free gearing interposed between the shafts; a braking member interposed between the aforesaid braking members and connected with part of the gearing; a stationary part; means for connecting said braking member to the said part to permit its rotation relative thereto in one direction only; and means whereby the braking members may be engaged.

9. In transmission mechanism, the combination of a drive shaft; a driven shaft; a braking member connected to the drive shaft; a braking member carried by the driven shaft; normally free gearing interposed between the shafts whereby the driven shaft may be driven in the said direction as the driving shaft; a braking member interposed between the aforesaid braking members and connected with part of the gearing; a stationary part; means for connecting said braking member to the said part to permit its rotation relative thereto in one direction only; and means whereby the braking members may be engaged.

10. In transmission mechanism, the combination of alined driving and driven shafts; an epicyclic gear train forming a driving connection between the two shafts including a rotatable part concentric with the shafts; means, initially inoperative for applying a variable frictional resistance to the rotation of said part relative to the driven shaft; a stationary part; a braking disk having an overrunning clutch connection with the said part whereby the said disk can rotate only in the same direction as the normal direction of rotation of the shafts; and means whereby, when a variable braking resistance is applied to the rotation of the aforesaid rotatable part relative to the shafts, a variable braking resistance is also simultaneously applied between the aforesaid part and the aforesaid disk, whereby the revoluble parts may be frictionally locked together to cause the two shafts to move at the same speed or the frictional resistance to the rotation of the first mentioned rotatable part relative both to the shafts and to the stationary part aforesaid gradually reduced to obtain a difference in speed of the two shafts.

11. In transmission mechanism, the combination of alined driving and driven shafts; an epicyclic gear train forming a driving connection between the two shafts including a rotatable part concentric with the shafts; means for applying a variable frictional resistance to the rotation of said part relative to the driven shaft; a stationary part; a braking disk having an overrunning clutch connection with the said part whereby the said disk can rotate only in the same direction as the normal direction of rotation of the shafts; and manually controlled means adapted by a continuous movement in one direction to apply both frictional resistances to the rotation of the aforesaid rotatable part.

12. In transmission mechanism, the combination of alined driving and driven shafts; an epicyclic gear train forming a driving connection between the two shafts including a rotatable part concentric with the shafts; means for applying a variable frictional resistance to the rotation of said part relative to the shafts between each shaft and the said part; a stationary part; a braking disk having an over-running clutch connection with the said part whereby the said disk can rotate only in the same direction as the normal direction of rotation of the shafts; and means, whereby, when a variable braking resistance is applied to the rotation of the aforesaid rotatable part relative to the shafts, a variable braking resistance is also simultaneously applied between the aforesaid part and the aforesaid disk, whereby the revoluble parts may be frictionally locked together to cause the two shafts to move at the same speed or the frictional resistance to the rotation of the first mentioned rotatable part relative both to the shafts and to the stationary part aforesaid gradually reduced to obtain a difference in speed of the two shafts.

13. In transmission mechanism, the combination of alined driving and driven shafts; an epicyclic gear train forming a driving connection between the two shafts including a rotatable part concentric with the shafts; means for applying a variable frictional resistance to the rotation of said parts relative to the shafts between each shaft and the said part; a stationary part; a braking disk having an over-running clutch connection with the said part whereby the said disk can rotate only in the same direction as the normal direction of rotation of the shafts; and manually controlled means adapted by a continuous movement in one direction to apply both frictional resistances to the rotation of the aforesaid rotatable part.

Signed at Toronto this 19th day of June, 1930.

CLIFFORD SIFTON.